Patented Oct. 24, 1933

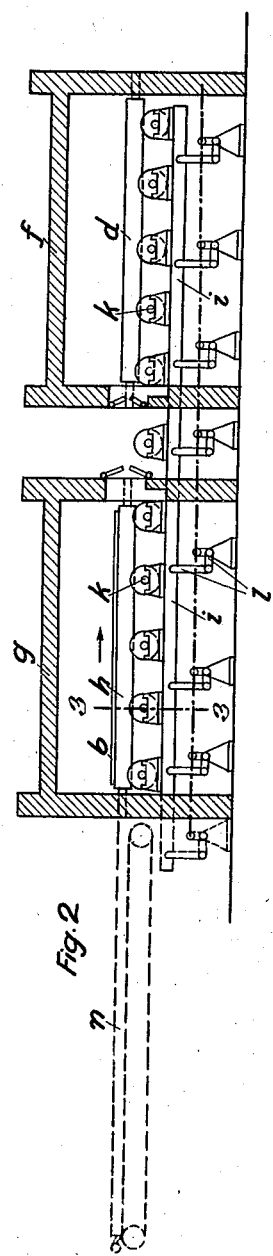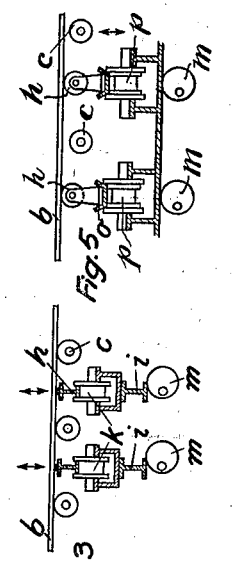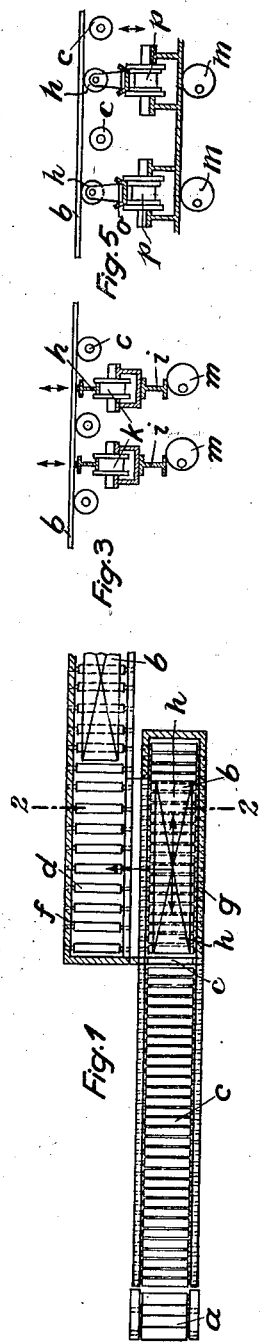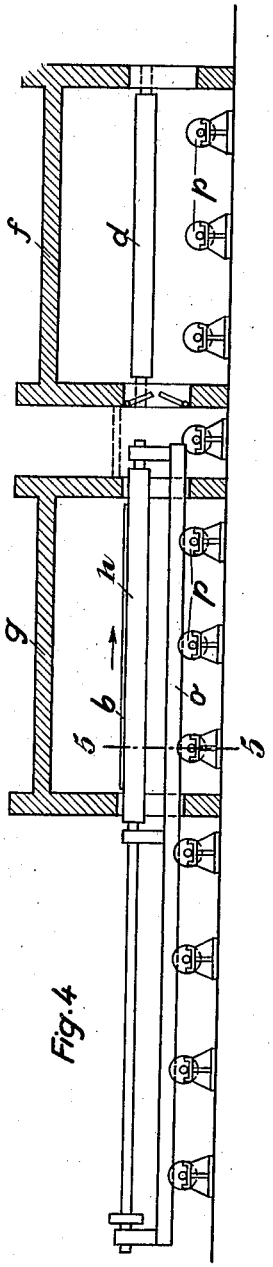

1,931,628

UNITED STATES PATENT OFFICE 1,931,628

APPARATUS FOR CONVEYING GLASS SHEETS

Lambert von Reis, Herzogenrath, Germany, assignor, by mesne assignments, to The American Bicheroux Company, a corporation of Delaware Application April 2, 1929, Serial No. 352,020, and in Germany April 10, 1928

4 Claims. (Cl. 49—3)

This invention relates to a method and apparatus for displacing glass sheets, especially rolled glass sheets while still hot, from one roller conveyor to another parallel one, the object of the invention being to effect this carrying-over in a simple manner and in such a way as to avoid injuries to the glass edges and deformations of the glass sheets such as frequently occur in the use of the known devices for displacing or shifting glass sheets from one place to another, such known devices generally consisting of pushing shovels or mechanical pushing mechanisms which seize the glass sheets at their edges and push them ahead exerting a pressure on the edges.

Some embodiments of the invention are illustrated in the accompanying drawing in which:

Fig. 1 is a diagrammatic plan view, partly in section, of a glass sheet forming and lehring plant comprising two parallel roller conveyors, one of which is a take-off and supplying conveyor extending from the sheet forming machine into a preliminary annealing chamber, while the other is the roller conveyor of a lehr, Fig. 2 is a section, on an enlarged scale, along the line 2—2 of Fig. 1, illustrating the means for carrying the sheets from one conveyor to the other, Fig. 3 is a modified form and shows a sectional view through a modified structure and would correspond to the vertical section 3—3 of Figure 2, Fig. 4 is a sectional view, similar to Fig. 2, of another form of the sheet displacing device, and Fig. 5 is a section along the line 5—5 of Fig. 4.

In the plan shown in Fig. 1, $a$ designates a rolling machine designed to form glass sheets $b$ which are taken off the machine by a roller conveyor $c$ and conveyed to a chamber $g$ at a speed preferably corresponding to the rolling speed of the machine $a$. $d$ is another roller conveyor which is arranged parallelly of the conveyor $c$ and which, in the embodiment illustrated, is disposed in a lehr $f$ constituting the means for conveying the glass sheets through this lehr. The rollers of the lehr conveyor $d$ are rotated at a speed lower than the rollers of the conveyor $c$. In the chamber $g$ the glass sheets are subjected to a pre-cooling and pre-hardening. When the sheets $b$ are in the chamber $g$, the rollers of the conveyor $c$ in that chamber have preferably imparted to them an alternate rotation in opposite directions so as to keep the sheets in a horizontal reciprocating motion, until they have obtained the necessary rigidity for being carried to the slowly rotating rollers of the conveyor $d$ in the lehr $f$ without any danger for the evenness of the sheets. The transfer is accomplished by rigid transfer elements $h$ which are interposed between the adjacent final rollers of the conveyor $c$, and are capable of being shifted to enter between the adjacent initial rollers of the conveyor $d$.

The means provided according to the invention for carrying the glass sheets from the conveyor $c$ to the conveyor $d$ are more fully described hereinafter and shown in detail in Figs. 2 to 5 of the drawing.

According to Figs. 2 and 3 the transfer elements are in the form of bars $h$ mounted between and parallelly of those rollers of the conveyor $c$ which lie laterally of the lehr $f$. Arranged underneath the bars $h$ are bars $i$ which extend transversely through the chamber $g$ and the lehr $f$. The bars $i$ carry guide wheels $k$ on which the bars $h$ are supported and adapted to be moved into and out of the lehr $f$ between the rollers of the conveyor $d$. The bars $i$ with the guide wheels $k$ and the bars $h$ can be raised and lowered. This raising and lowering may be effected by interconnected levers $l$ (Fig. 2), by eccentrics $m$ (Fig. 3) or by any other suitable means. The lateral shifting of the bars $h$ may be effected either manually or mechanically by an actuating device $n$ which is arranged at the outer side of the chamber $g$ as indicated by dotted lines.

When in their initial position the bars $h$ lie below the surface of the roller conveyor $c$. When a glass sheet has to be carried from the conveyor $c$ to the conveyor $d$ of the lehr $f$, the bars $h$ are raised to such an extent that the sheet is lifted off the rollers of the conveyor $c$ and supported only by the bars $h$. The bars $h$ with the sheet on them are then pushed into the lehr $f$. When the sheet is in the lehr, the bars $h$ are lowered so that the sheet will deposit on the rollers of the lehr conveyor $d$. The bars $h$ are thereupon returned to their position between the rollers of the conveyor $c$ keeping them in their lowered position.

In the form of device shown in Figs. 4 and 5, the transfer elements take the form of axially shiftable rollers $h$ arranged between relatively stationary rollers of the conveyor $c$ and which can be shifted into free spaces between the rollers of the lehr conveyor $d$. The shiftable rollers $h$ are mounted in a frame $o$ which is adapted to travel on wheels $p$. There may either be provided means for raising and lowering the shiftable rollers similar to the bars $h$ or means for raising and lowering the relatively stationary rollers as indicated in Fig. 5. In the latter case the stationary rollers are lowered before the carrying over of a sheet so that same will then be supported only by the shiftable rollers. The rollers of the first section or place of the lehr must then be raisable and lowerable accordingly.

Instead of making only some of the rollers of the conveyor c shiftable, the construction may also be so that all of the rollers of the conveyor c situated at the side of the lehr can be moved into and out of the lehr, the first section of which is to contain no rollers in this case.

Having thus described my invention, what I claim as new and desire to secure by Letters Patent is:—

1. Apparatus for conveying a plastic glass sheet which comprises a roller conveyor, a second roller conveyor adjacent and parallel to the first conveyor, and means for transferring the sheet from the first conveyor to the second conveyor, such means comprising a reciprocating carriage, idler rollers forming a bed for the carriage, and means for raising and lowering the said idler rollers whereby the sheet of glass is lifted from one conveyor and deposited upon the second conveyor.

2. Apparatus for conveying a plastic glass sheet which comprises a roller conveyor, a second roller conveyor adjacent and parallel to the first conveyor, and means for transferring the sheet from the first to the second of said conveyors, such means comprising a reciprocating carriage, the bed of such carriage being composed of rollers adapted to be brought into alignment with the rollers of one or the other of the conveyor rollers as the carriage is reciprocated.

3. Apparatus for conveying a plastic glass sheet which comprises a roller conveyor, a second roller conveyor adjacent and parallel to the first conveyor, each of said conveyors having a section wherein the rollers are more widely separated than in the rest of the conveyors, a carriage adapted to reciprocate between such sections, rollers carried by the said carriage and so spaced as to fit between the spaced rollers of the conveyors, and means whereby the said rollers of the carriage may be raised and lowered in respect to the horizontal level of the rollers of the said conveyors.

4. In sheet glass apparatus, means for forming the sheet, a conveyor for receiving the sheet from the forming means and including a plurality of horizontally arranged rotatable rolls for advancing the sheet forwardly, a second conveyor positioned along one side of the first conveyor closely adjacent thereto and extending parallel therewith and adapted to receive the sheet therefrom, said second conveyor also consisting of a plurality of horizontally arranged rotatable rolls operating to advance the sheet in the same direction as the first mentioned conveyor, and an annealing leer enclosing the second conveyor.

LAMBERT von REIS.